3,331,834
PROCESS FOR THE PRODUCTION OF ACID HALIDES AND USE THEREOF IN THE PRODUCTION OF PENICILLINS
Milton Wolf, West Chester, and David Flitter, Havertown, Pa., assignors to American Home Products Corporation, New York, N.Y., a corporation of Delaware
No Drawing. Filed July 27, 1965, Ser. No. 475,264
10 Claims. (Cl. 260—239.1)

This invention relates generally to the preparation of acylating agents and to their use in the preparation of penicillins. More particularly, the invention relates to novel methods for the production of organic acid halides and the use of said acid halides in the production of various 6-(acylamido)penicillanic acids.

The methods of the present invention are useful in the production of organic acid halides and the corresponding 6-(acylamido)penicillanic acids made therewith generally. Said methods, while not limited thereto, as will appear hereinafter; have particular applicability in the production of 6-(acylamido)penicillanic acids of the type disclosed in British patent specification No. 880,400; i.e. those penicillanic acids of the general formula:

A.

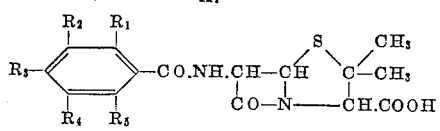

and non-toxic salts thereof, wherein $R_1$, $R_2$, $R_3$, $R_4$ and $R_5$ each represent a hydrogen or halogen atom, or an alkyl, aryl, acyl, aralkyl, cycloalkyl, heterocyclic, cyano, alkoxy, aryloxy, aralkoxy, alkenyl, alkenyloxy, alkenylthio, alkylthio, arylthio, aralkylthio, acyloxy, acylthio, acylamino, alkoxycarbonyl, alkysulfonyl, dialkylamino, sulfamyl or nitro group, the substituents being the same or different, and not more than four being hydrogen atoms, or any two adjacent substituents together, completing an unsaturated carbocyclic ring system, which may itself be substituted.

As stated in said British specification, also, the non-toxic salts of the above-designated penicillanic acids include those of the non-toxic metallic ions such as sodium, potassium, calcium and aluminum; as well as the ammonium and substituted ammonium salts; e.g. salts of such non-toxic amines as trialkylamines including triethylamine; and also those of procaine, dibenzylamine, N-benzyl-β-phenethylamine, 1-ephenamine, N,N₁-dibenzylethylenediamine, dehydroabietylamine, N,N₁-bis-dehydroabietylethylenediamine, and other amines known to form salts with benzyl penicillin.

The foregoing compounds are of value as antibacterial agents, such as nutritional supplements in animal feeds, as agents for the treatment of mastitis in cattle, and as therapeutic agents in poultry and animals, including man, in the treatment especially of infectious diseases caused by Gram-positive bacteria.

Of particular interest are the penicillins, 6-(2-alkoxy-1-naphthamido)penicillanic acids and the non-toxic salts thereof, and more specifically, 6-(2-ethoxy-1-naphthamido)penicillanic acid now known generically as "nafcillin," and the sodium salt thereof, now known generically as "sodium nafcillin." The preparation of these last named compounds are described specifically in U.S. Patent 3,157,639.

As disclosed in said U.S. Patent 3,157,639, nafcillin may be prepared by a method comprising the N-acylation of 6-APA with 2-ethoxy-1-naphthamido acid chloride in the presence of triethylamine. The acylation is conducted by suspending 6-aminopenicillanic acid in anhydrous alcohol-free chloroform, adding the tertiary amine thereto, and then the acid chloride dissolved in chloroform. The mixture is then acidified by addition of acidulated water and the aqueous layer is removed. In the process described in said patent, the solvent layer is then treated with sodium bicarbonate solution and the resulting aqueous bicarbonate layer then separated and concentrated under low temperature and pressure to isolate the sodium salt of the penicillin product formed, i.e., sodium nafcillin. However, it has been found that superior yields of product are obtained when the aqueous bicarbonate layer is worked up further by washing with ether, covering with methyl isobutyl ketone, and acidifying again with diluted sulfuric acid to pH 2.7–3.0. The organic extract is then dried over magnesium sulfate and then filtered. Thereafter, sodium 2-ethyl-hexanoate in methyl isobutyl ketone is added to result in a gummy precipitate. The precipitate is dissolved in water and, only then, is concentrated in vacuo to leave the final crystalline product.

Organic acid halides of the kind herein contemplated for use in the invention have heretofore been prepared by reacting either a thionyl halide or a phosphorous pentahalide with an organic acid selected for its desired organic group. The starting materials, thionyl halides and phosphorous pentahalides, are relatively expensive. Moreover, the resulting products have to be isolated and dissolved in an organic solvent before they are added to the reaction medium containing the 6-aminopenicillanic acid or derivative thereof.

We have now made the discovery that organic acid halides of the kind useful in acylating 6-aminopenicillanic acid, or derivatives thereof, in the preparation of penicillins, may be made by a relatively simple process which utilizes one of the known Vilsmeier reagents of the following formula:

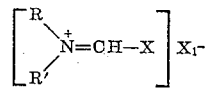

wherein R and R' represent the same or different lower alkyl groups or phenyl, and, when joined, complete a piperidino, morpholino, or pyrrolidino ring, and wherein X and $X_1$ are each selected from the same halogen; for the in situ preparation of the required acid halide by reaction with the appropriate organic carboxylic acid. In accordance with a primary feature of the invention, the solution containing the organic acid halide, in situ, is then utilized for acylating 6-aminopenicillanic acid directly, without the need for isolating the acid halide before use.

Vilsmeier reagents per se, as known to the art, may be prepared generally by the phosgenation of an N,N-disubstituted formamide, in an inert organic solvent, under an inert atmosphere, at a reduced temperature. As the N,N-disubstituted formamide, there may be utilized such as dimethylformamide, diethylformamide, di-n-butylformamide, N-formylpiperidine, N-formylmorpholine, N-formylpyrrolidine, N-methyl-N-phenylformamide, and the like. By the term "phosgenation" as herein used, is meant the halogenation of an organic acid with a compound of the formula "$COX_2$," wherein X is a halogen; e.g., phosgene, wherein X is chlorine. In lieu of phosgenation, the N,N-disubstituted formamide may be halogenated to prepare the desired Vilsmeier reagent by reaction with other acyl halides than phosgene; e.g., oxallyl chloride, phosphorous oxychloride, phosphorous pentachloride, thionyl chloride, and the like.

Preferably, dimethylformamide and phosgene itself are used for obtaining the Vilsmeier reagent in the form of the chloride. Although not required, it is also preferred to employ methylene chloride as the inert organic solvent for preparing the reaction mixture comprising the dimethylformamide into which the phosgene is introduced, nitrogen as the inert atmosphere over the reaction mixture, and a low reaction temperature of the order of about −20° C.

The organic acid halide desired may be prepared generally by combining, with a suspension or solution of the selected organic carboxylic acid in an inert organic liquid medium, the chosen Vilsmeier reagent under an inert atmosphere. The resulting solution containing the organic acid halide formed, as well as residual Vilsmeier reagent and the N,N-disubstituted formamide may then, in accordance with the invention, be added directly, without separation from said other components, to a solution of 6-aminopenicillanic acid in an inert organic solvent containing a halide acceptor and maintained at a low temperature. Instead of the free organic carboxylic acid to be halogenated by the selected Vilsmeier reagent, the sodium or other metallic or organic (e.g. triethylammonium) salts of the carboxylic acid may be used instead.

In a preferred embodiment of the invention, the chloride of the organic acid, obtained with the use of the Vilsmeier reagent in the form of its chloride for reacting with the selected organic acid, and unseparated from its reaction medium, is added to a solution of 6-aminopenicillanic acid, under an inert atmosphere, and at a low temperature, e.g., about 0° C. This application of the method has been found to be particularly suitable for the synthesis of nafcillin, wherein phosgenation of dimethylformamide with phosgene per se, reaction of the resulting Vilsmeier reagent with 2-ethoxy-1-naphthoic acid in an inert organic solvent, and, thereafter, addition of the entire reaction mixture resulting therefrom, to 6-aminopenicillanic acid dissolved in an organic solvent which contains a halogen acceptor; surprisingly results in high yields of pure product. A schematic representation of the reactions involved is given below:

advantageously prepared by the present method, the important penicillins, phenoxymethyl pencillin and 6-(α-phenoxy-propionamido)penicillanic acid, provided proper conditions are maintained to avoid attack by the Vilsmeier reagent of the methylene group of the "aliphatic" type carboxylic acid utilized. Specifically, such conditions are provided by the use of an "inverse" procedure comprising the slow addition of a suspension of the selected Vilsmeier reagent in a suitable organic reaction medium; e.g., methylene chloride, to a solution of the selected organic carboxylic acid in a suitable organic solvent for the acid, which again may be methylene chloride, to keep the concentration of free Vilsmeier reagent low during the halogenation of the organic carboxylic acid. Thereafter, the resulting reaction mixture is added to a solution of 6-aminopencillanic acid and a halogen acceptor; e.g., triethylamine, to obtain the desired penicillin compound.

The foregoing "inverse" procedure is also useful for the preparation of other "aliphatic" type penicillins; e.g., of the ampicillin type. Thus, by utilizing suitably protected amino acids, the "inverse" procedure may be used in the preparation of said ampicillin type compounds of the following general formula:

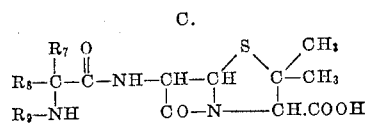

and non-toxic salts thereof, wherein $R_7$ represents a member of the group consisting of hydrogen and lower alkyl; $R_8$ represents a member of the group consisting

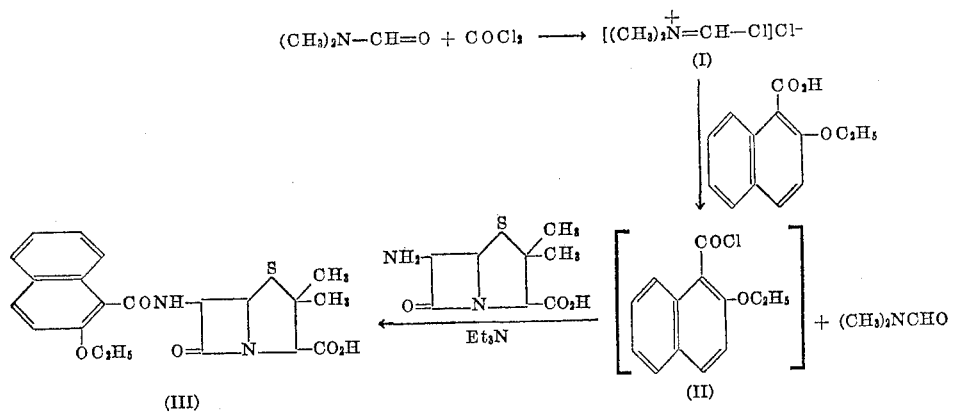

The method of the invention, as indicated hereinbefore, is useful also in the preparation of penicillins other than those represented by Formula A above. For example, there may also be prepared those of the "aliphatic" type of the general formula:

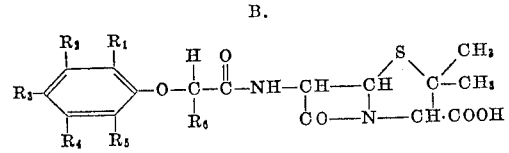

and non-toxic salts thereof, wherein $R_6$ is of the group consisting of hydrogen and methyl. Thus, there may be of hydrogen, (lower)alkyl, (lower)alkenyl, (lower)alkenoyl(lower)alkyl, di-acetoxyphenyl(lower)alkyl, tosylamino(lower)alkyl, nitrophenyl(lower)alkyl, O-benzyl(lower)alkyl, acetoxyphenyl(lower)alkyl, N-benzylimidazoyl(lower)alkyl, indolyl(lower)alkyl, (lower)cycloalkyl, phenyl, and phenyl substituted at from 1 to 3 positions by a member of the group consisting of di(lower)alkylamino, (lower)alkanoylamino, (lower)alkanoyloxy, (lower)alkoxy, sulfamyl, halo, and trifluoromethyl; $R_7$ and $R_8$, when joined together, complete a ring that is (lower)cycloalkyl; $R_9$ represents hydrogen, and when joined with $R_8$, completes a ring of the group consisting of pyrrolidine, (lower)acetoxypyrrolidine, and tosyloxypyrrolidine.

Below is given a schematic representation of the reactions involved in an exemplary preparation of ampicillin:

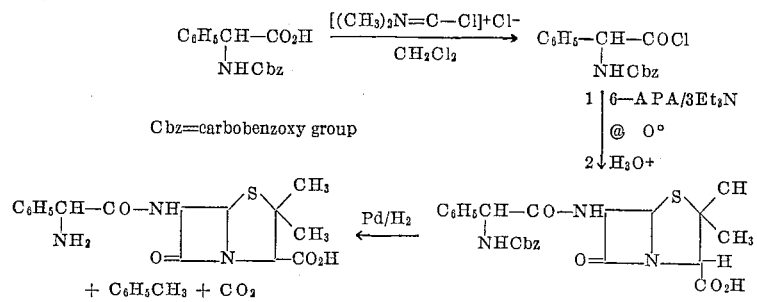

Cbz=carbobenzoxy group

The following examples are illustrative of the invention, but are not to be considered necessarily limitative thereof.

EXAMPLE I.—6-(2-ETHOXY-1-NAPHTHAMIDO) PENICILLANIC ACID (III)

(a) *Chloromethylene dimethylammonium chloride (I)*

Chloromethylene dimethylammonium chloride is prepared by the introduction of gaseous phosgene (99.0 g., 1.0 m.) into a solution of dimethylformamide (146 g., 2.0 m.) in methylene chloride (400 ml.) cooled to a −20° C. in a nitrogen atmosphere. After the addition is complete, the mixture is stirred for 3.5 hours and the solid collected by filtration under dry nitrogen. The product is the title compound (a), which may be obtained as a colorless solid.

(b) *2-ethoxy-1-naphthoyl chloride (II)*

A suspension of 2-ethoxy-1-naphthoic acid (107.5 g., 0.497 m.) in methylene chloride (160 ml.) is added to chloromethylene dimethylammonium chloride (61.5 g., 0.48 m.) in a nitrogen atmosphere. After stirring, for one hour, the solution of 2-ethoxy-1-naphthoyl chloride is used directly in the acylation of 6-aminopenicillanic acid.

(c) *6-(2ethoxy-1-naphthamido)penicillanic acid (III) (nafcillin)*

One-half of the solution of 2-ethoxy-1-naphthoyl chloride (0.24 m.) is added dropwise with stirring at 0° C. in a nitrogen atmosphere to a solution of 6-aminopenicillanic acid (47.5 g., 0.22 m.) in methylene chloride (140 ml.) containing triethylamine (82.0 g., 0.81 m.). After the addition is complete, the reaction mixture is stirred at 0° C. for 30 minutes, poured into ice water (417 ml.) and the organic layer separated, washed successively with ice water (167 ml.), ice water adjusted to pH 10.4 (167 ml.), and again ice water (75 ml.). Methyl isobutyl ketone (30 ml.) is added to the combined aqueous extracts and the pH adjusted to 3.0 by addition of 4 N sulfuric acid. A quantity (ca. 0.1 g.) of seed crystal is added, and the crystallization of title compound effected by stirring at 0° C. overnight. The crystalline solid is collected by filtration and washed successively with water, methylisobutylketone, water, and hexane. After drying at 45° C. in a circulating air oven, the product weighed 70.0 g. (77.0%); bioassay, 930 µg./mg.; iodometric assay, 996 µg./mg.

EXAMPLE II.—6-(2-CHLOROBENZAMIDO) PENICILLANIC ACID o-Chlorobenzoyl chloride, prepared from o-chlorobenzoic acid and chloromethylenedimethylammonium chloride in a manner similar to Example I(b), is reacted with 6-aminopenicillanic acid and triethylamine in a manner similar to Example I(c), to yield the title compound.

EXAMPLE III.—6-(p-TOLUAMIDO)PENICILLANIC ACID p-Toluoyl chloride, prepared from p-toluic acid and chloromethylenedimethylammonium chloride in a manner similar to Example I(b) is reacted with 6-aminopenicillanic acid and triethylamine in a manner similar to Example I(c) to yield the title compound.

EXAMPLE IV.—6-(2-BIPHENYLCARBOXAMIDO) PENICILLANIC ACID 2-biphenylcarboxylic acid chloride, prepared from 2-biphenylcarboxylic acid and chloromethylenedimethylammonium chloride in a manner similar to Example I(b), is reacted with 6-aminopencillanic acid and triethylamine in a manner similar to Example I(c) to yield the title compound.

EXAMPLE V.—6-(2-ACETYLBENZAMIDO) PENICILLANIC ACID 2-acetylbenzoyl chloride, prepared from 2-acetylbenzoic acid and chloromethylenedimethylammonium chloride in a manner similar to Example I(b), is reacted with 6-aminopenicillanic acid and triethylamine in a manner similar to Example I(c) to yield the title compound.

EXAMPLE VI.—6-(4-BENZYLBENZAMIDO) PENICILLANIC ACID 4-benzylbenzoyl chloride, prepared from 4-benzylbenzoic acid and chloromethylenedimethylammonium chloride in a manner similar to Example I(b), is reacted with 6-aminopenicillanic acid and triethylamine in a manner similar to Example I(c)) to yield the title compound.

EXAMPLE VII.—6-(4-CYCLOHEXYLBENZAMIDO) PENICILLANIC ACID 4-cyclohexylbenzoyl chloride, prepared from 4-cyclohexylbenzoic acid and chloromethylenedimethylammonium chloride in a manner similar to Example I(b), is reacted with penicillanic acid and triethylamine in a manner similar to Example I(c) to yield the title compound.

EXAMPLE VIII.—6-(2-FURAMIDO)PENICILLANIC ACID 2-furoyl chloride, prepared from 2-furoic acid and chloromethylenedimethylammonium chloride in a manner similar to Example I(b), is reacted with 6-aminopenicillanic acid and triethylamine in a manner similar to Example I(c) to yield the title compound.

EXAMPLE IX—6-(2,6-DIMETHOXYBENZAMIDO) PENICILLANIC ACID 2,6-dimethoxybenzoyl chloride, prepared from 2,6-dimethoxybenzoic acid and chloromethylenedimethylammonium chloride in a manner similar to Example I(c), is reacted with 6-aminopenicillanic acid and triethylamine in a manner similar to Example I(c) to yield the title compound.

EXAMPLE X.—6-(4-PHENOXYBENZAMIDO) PENICILLANIC ACID 4-phenoxybenzoyl chloride, prepared from 4-phenoxybenzoic acid and chloromethylenedimethylammonium chloride in a manner similar to Example I(b), is reacted with 6-aminopenicillanic acid and triethylamine in a manner similar to Example I(c) to yield the title compound.

EXAMPLE XI.—6-(3-BENZYLOXYBENZAMIDO) PENICILLANIC ACID 3-benzyloxybenzoyl chloride, prepared from 3-benzyloxybenzoic acid and chloromethylenedimethylammonium chloride in a manner similar to Example I(b), is reacted with 6-aminopenicillanic acid and triethylamine in a manner similar to Example I(c) to yield the title compound.

EXAMPLE XII.—6-(4-ALLYL-2-METHOXYBENZAMIDO)PENICILLANIC ACID 4-allyl-2-methoxybenzoyl chloride, prepared from 4-allyl-2-methoxybenzoic acid and chloromethylenedimethylammonium chloride in a manner similar to Example I(b), is reacted with 6-aminopenicillanic acid and triethylamine in a manner similar to Example I(c) to yield the title compound.

EXAMPLE XIII.—6-(4-ALLYLOXYBENZAMIDO) PENICILLANIC ACID 4-allyloxybenzoyl chloride, prepared from 4-allyloxybenzoic acid and chloromethylenedimethylammonium chloride in a manner similar to Example I(b), is reacted with 6-aminopenicillanic acid and triethylamine in a manner similar to Example I(c) to yield the title compound.

EXAMPLE XIV.—6-(2-ALLYLTHIOBENZAMIDO) PENICILLANIC ACID 2-allylthiobenzoyl chloride, prepared from 2-allylthiobenzoic acid and chloromethylenedimethylammonium chloride in a manner similar to that of Example I(b), is reacted with 6-aminopenicillanic acid and triethylamine in a manner similar to Example I(c) to yield the title compound.

EXAMPLE XV.—6-(2-METHYLTHIOBENZAMIDO) PENICILLANIC ACID 2-methylthiobenzoyl chloride, prepared from 2-methylthiobenzoic acid and chloromethylenedimethylammonium chloride in a manner similar to Example I(b), is reacted with 6-aminopenicillanic acid and triethylamine in a manner similar to Example I(c) to yield the title compound.

EXAMPLE XVI.—6-(4-PHENYLTHIOBENZAMIDO) PENICILLANIC ACID 4-phenylthiobenzoyl chloride, prepared from 4-phenylthiobenzoic acid and chloromethylenedimethylammonium chloride in a manner similar to that of Example I(b), is reacted with 6-aminopenicillanic acid and triethylamine in a manner similar to Example I(c) to yield the title compound.

EXAMPLE XVII.—6-(4-ACETOXYBENZAMIDO)- PENICILLANIC ACID 4-acetoxybenzoyl chloride, prepared from 4-acetoxybenzoic acid and chloromethylenedimethylammonium chloride in a manner similar to Example I(b), is reacted with 6-aminopenicillanic acid and triethylamine in a manner similar to Example I(c) to yield the title compound.

EXAMPLE XVIII.—6-(4-ACETYLTHIOBENZAMIDO)PENICILLANIC ACID 4-acetylthiobenzoyl chloride, prepared from 4-acetylthiobenzoic acid and chloromethylenedimethylammonium chloride in a manner similar to Example I(b), is reacted with 6-aminopenicillanic acid and triethylamine in a manner similar to Example I(c) to yield the title compound.

EXAMPLE XIX.—6-(4-ACETAMIDOBENZAMIDO)PENICILLANIC ACID 4-acetamidobenzoyl chloride, prepared from 4-acetamidobenzoic acid and chloromethylenedimethylammonium chloride in a manner similar to Example I(b), is reacted with 6-aminopenicillanic acid and triethylamine in a manner similar to Example I(c) to yield the title compound.

EXAMPLE XX.—6-(2-CARBETHOXYBENZAMIDO)PENICILLANIC ACID 2-carbethoxybenzoyl chloride, prepared from 2-carbethoxybenzoic acid and chloromethylenedimethylammonium chloride in a manner similar to Example I(b), is reacted with 6-aminopenicillanic acid and triethylamine in a manner similar to Example I(c) to yield the title compound.

EXAMPLE XXI.—6-(2-METHYLSULFONYLBENZAMIDO)PENICILLANIC ACID 2-methylsulfonylbenzoyl chloride, prepared from 2-methylsulfonylbenzoic acid and chloromethylenedimethylammonium chloride in a manner similar to Example I(b), is reacted with 6-aminopenicillanic acid and triethylamine in a manner similar to Example I(c) to yield the title compound.

EXAMPLE XXII.—6-(4-DIMETHYLAMINOBENZAMIDO)PENICILLANIC ACID 4-dimethylaminobenzoyl chloride hydrochloride, prepared from 4-dimethylaminobenzoic acid and chloromethylenedimethylammonium chloride in a manner similar to Example I(b), is reacted with 6-aminopenicillanic acid and triethylamine (extra mole) in a manner similar to Example I(c) to yield the title compound.

EXAMPLE XXIII.—6-(4-SULFAMYLBENZAMIDO)PENICILLANIC ACID 4-sulfamylbenzoyl chloride, prepared from 4-sulfamylbenzoic acid and chloromethylenedimethylammonium chloride in a manner similar to Example I(b), is reacted with 6-aminopenicillanic acid and triethylamine in a manner similar to Example I(c) to yield the title compound.

EXAMPLE XXIV.—6-(2-NITROBENZAMIDO)- PENICILLANIC ACID 2-nitrobenzoyl chloride, prepared from 2-nitrobenzoic acid and chloromethylenedimethylammonium chloride in a manner similar to Example I(b), is reacted with 6-aminopenicillanic acid and triethylamine in a manner similar to Example I(c) to yield the title compound.

EXAMPLE XXV.—6-(α-PHENOXYPROPIONAMIDO)PENICILLANIC ACID

A suspension of chloromethylenedimethylammonium chloride in methylene chloride (prepared as in Example I(a)) is slowly added to a solution of α-phenoxypropionic acid in methylene chloride cooled to −5 to −10° C. Addition of this reaction mixture to a solution of 6-aminopenicillanic acid and triethylamine as in Example I(c) yields the title compound.

EXAMPLE XXVI.—α-AMINOBENZYLPENICILLIN (AMPICILLIN)

A solution of chloromethylenedimethylammonium chloride (prepared as in Example I(b)) is added to a solution of D(−)-α-benzyloxycarbonylamino-α-phenylacetic acid in methylene chloride at −5 to −10° C. This reaction mixture is then added to a solution of 6-aminopenicillanic acid and triethylamine (3 moles) in methylene chloride at −50° C. and the mixture processed as described in F. P. Doyle et al., J. Chem. Soc., 1962, 1440, to yield the title compound.

We claim:
1. The method of preparing penicillins of the formula:

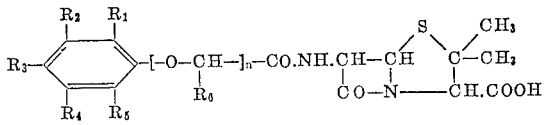

wherein $R_1$, $R_2$, $R_3$, $R_4$ and $R_5$ each is selected from the group consisting of hydrogen, lower alkyl, lower alkoxy, carbo(lower)alkoxy, lower alkylsulfonyl, lower alkanoxy, lower alkanoylthio, lower alkanoylimino, lower alkenyl, lower alkenyloxy, lower alkenylthio, lower cycloalkyl, lower alkanoyl, halogen, cyano, phenyl, phenoxy, phenylthio, benzyl and benzyloxy, and any two adjacent substituents, $R_1$ and $R_2$, $R_2$ and $R_3$, $R_3$ and $R_4$, $R_4$ and $R_5$, when joined, complete with the phenyl group to which they are attached, a fused ring which is naphthalene; $R_6$ is selected from the group consisting of hydrogen and lower alkyl; and $n$ is an integer from 0 to 1; which method comprises:

(A) preparing an organic acid halide of the formula:

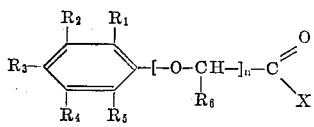

wherein $R_1$, $R_2$, $R_3$, $R_4$, $R_5$ and $R_6$, and $n$ have the same meaning as above, by reacting:
(1) a compound of the formula

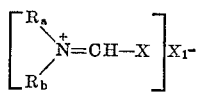

wherein each of $R_a$ and $R_b$ is selected from the group consisting of lower alkyl and phenyl, and, when joined, complete a ring of the group consisting of piperidino, morpholino and pyrrolidino and wherein each of X and $X_1$ is the same halogen, with
(2) a compound of the formula:

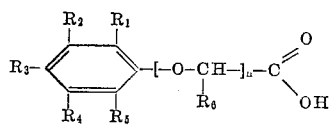

wherein $R_1$, $R_2$, $R_3$, $R_4$, $R_5$, $R_6$ and $n$ have the same meaning as above;
(B) admixing:
(3) the reaction mixture obtained in (A), with
(4) 6-aminopenicillanic acid; and
(C) thereafter recovering crystals of penicillin product from the admixture of (3) and (4).

2. The method of preparing penicillins as set forth in claim 1, wherein the reaction mixture obtained in (A) includes methylene chloride as an inert organic solvent.

3. The method of preparing penicillins as set forth in claim 2, wherein the reaction mixture obtained in (B) includes triethylamine as a halogen acceptor.

4. The method of preparing penicillins of the formula:

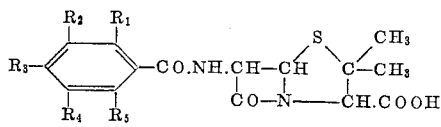

wherein $R_1$, $R_2$, $R_3$, $R_4$ and $R_5$ each is selected from the group consisting of hydrogen, lower alkyl, lower alkoxy, carbo(lower)alkoxy, lower alkyl sulfonyl, lower alkanoxy, lower alkanoylthio, lower alkanoylimino, lower alkenyl, lower alkenyloxy, lower alkenylthio, lower cycloalkyl, lower alkanoyl, halogen, cyano, phenyl, phenoxy, phenylthio, benzyl and benzyloxy, and any two adjacent substituents, $R_1$ and $R_2$, $R_2$ and $R_3$, $R_3$ and $R_4$, $R_4$ and $R_5$, when joined, complete with the phenyl group to which they are attached, a ring which is naphthalene; and $R_6$ is selected from the group consisting of hydrogen and lower alkyl; which method comprises:

(A) preparing an organic acid halide of the formula:

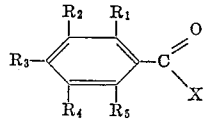

wherein $R_1$, $R_2$, $R_3$, $R_4$ and $R_5$ have the same meaning as above, by reacting:
(1) a Vilsmeier compound of the formula:

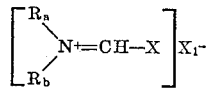

wherein each of $R_a$ and $R_b$ is selected from the group consisting of lower alkyl and phenyl, and when joined, complete a ring of the group consisting of piperidino, morpholino and pyrrolidino, and wherein each of X and $X_1$ is the same halogen, with
(2) a compound of the formula

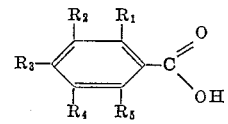

wherein $R_1$, $R_2$, $R_3$, $R_4$ and $R_5$ have the same meaning as above;
(B) admixing:
(3) the reaction mixture obtained in (A), with
(4) 6-aminopenicillanic acid; and
(C) thereafter recovering crystals of penicillin product from the admixture of (3) and (4).

5. The method of preparing penicillins as set forth in claim 4, wherein $R_1$ is ethoxy, $R_2$ and $R_3$ are each hydrogen, $R_4$ and $R_5$ are joined to complete a ring which is naphthalene, and each of X and $X_1$ is chlorine.

6. The method of preparing penicillins as set forth in claim 6, wherein the organic acid halide is 2-ethoxy-1-naphthoyl chloride, the Vilsmeier compound is chloromethylene-dimethylammonium chloride, and triethylamine is included as halogen acceptor.

7. The method of preparing penicillins as set forth in claim 6, wherein methylene chloride is included as inert organic solvent.

8. The method of preparing penicillins of the formula:

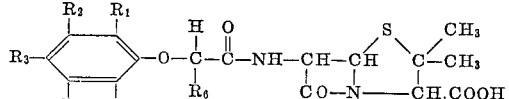

wherein $R_1$, $R_2$, $R_3$, $R_4$ and $R_5$ each is selected from the group consisting of hydrogen, lower alkyl, lower alkoxy, carbo(lower)alkoxy, lower alkylsulfonyl, lower alkanoxy, lower alkanoythio, lower akanoylimino, lower alkenyl, lower alkenyloxy, lower alkenylthio, lower cycloalkyl, lower alkanoyl, halogen, cyano phenyl, phenoxy, phenylthio, benzyl, and benzyloxy, and any two adjacent substituents, $R_1$ and $R_2$, $R_2$ and $R_3$, $R_3$ and $R_4$, $R_4$ and $R_5$, when joined, complete with the phenyl group to which they are attached, a ring which is naphthalene, and $R_6$ is selected from the group consisting of hydrogen and lower alkyl; which method comprises:

(A) preparing an organic acid halide of the formula:

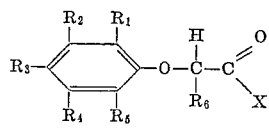

wherein $R_1$, $R_2$, $R_3$, $R_4$, $R_5$ and $R_6$ have the same meaning as above, by reacting; in an inert liquid organic action medium consisting essentially of methylene chloride;

(1) a compound of the formula:

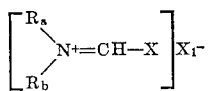

wherein each of $R_a$ and $R_b$ is selected from the group consisting of lower alkyl and phenyl, and, when joined, complete a ring of the group consisting of piperidino, morpholino and pyrrolidino, and wherein each of X and $X_1$ is the same halogen, with (2) an organic acid compound of the formula:

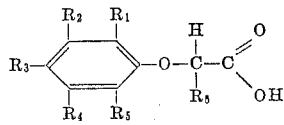

wherein $R_1$, $R_2$, $R_3$, $R_4$ and $R_5$ have the same meaning as above;

(B) admixing:
   (3) the reaction mixture obtained in (A), by slow addition to,
   (4) a mixture of 6-aminopenicillanic acid in an inert organic liquid reaction medium consisting essentially of methylene chloride; and (C) thereafter recovering crystals of penicillin product from the admixture of (3) and (4).

9. The method of preparing penicillins as set forth in claim 8, wherein triethylamine is included as halogen acceptor in the mixture obtained in (B).

10. The method of preparing penicillins as set forth in claim 9, wherein the organic acid compound is α-phenoxypropionic acid.

No references cited.

NICHOLAS S. RIZZO, *Primary Examiner.*